US012326945B2

(12) United States Patent
Neelakantan et al.

(10) Patent No.: US 12,326,945 B2
(45) Date of Patent: Jun. 10, 2025

(54) SYSTEMS AND METHODS FOR PROVIDING MULTI-TENANT ACCESS TO APPLICATIONS

(71) Applicant: Change Healthcare Holdings, LLC, Nashville, TN (US)

(72) Inventors: Ram Neelakantan, Saint Louis, MO (US); Praveen Kumar Thirumurugan, Wentzville, MO (US); Ian Price, Plano, TX (US)

(73) Assignee: Change Healthcare Holdings, LLC, Nashville, TN (US)

( * ) Notice: Subject to any disclaimer, the term of this patent is extended or adjusted under 35 U.S.C. 154(b) by 413 days.

(21) Appl. No.: 17/545,323

(22) Filed: Dec. 8, 2021

(65) Prior Publication Data

US 2023/0177179 A1  Jun. 8, 2023

(51) Int. Cl.
*G06F 21/60* (2013.01)
*G06F 21/31* (2013.01)

(52) U.S. Cl.
CPC ............ *G06F 21/604* (2013.01); *G06F 21/31* (2013.01)

(58) Field of Classification Search
CPC ....... G06F 21/604; G06F 21/31; G06F 21/629
See application file for complete search history.

(56) References Cited

U.S. PATENT DOCUMENTS

| | | | |
|---|---|---|---|
| 2015/0046204 A1* | 2/2015 | Sitina | G06Q 10/063 705/7.11 |
| 2017/0329957 A1* | 11/2017 | Vepa | G06F 21/445 |
| 2019/0068606 A1* | 2/2019 | Xiao | H04L 65/1063 |
| 2020/0344233 A1* | 10/2020 | Lai | G06Q 20/4014 |
| 2021/0144517 A1* | 5/2021 | Guim Bernat | H04L 41/0869 |
| 2022/0116445 A1* | 4/2022 | Filippou | H04L 41/0853 |

* cited by examiner

*Primary Examiner* — Christopher B Robinson
*Assistant Examiner* — Tania M Pena-Santana
(74) *Attorney, Agent, or Firm* — MARSHALL, GERSTEIN & BORUN LLP

(57) ABSTRACT

A multi-tenant sidecar application is created that allows entities to create contexts for each tenant, onboard users, assign users to contexts, and define roles and permissions for each user assigned to a context. When an application is onboarded into the sidecar application for an entity, an API is exposed to the application that allows it to receive details on the various users, contexts, and roles and permissions associated with the application. Only users who authenticate through an identity provider or an identity service provider may be allowed access to the API. Later, a user associated with the entity may use the sidecar application to log into an onboarded application and the application may retrieve the roles and contexts associated with the user for the entity using the API. The application may then be configured for the user according to the retrieved context and roles.

15 Claims, 4 Drawing Sheets

SYSTEMS AND METHODS FOR PROVIDING MULTI-TENANT ACCESS TO APPLICATIONS

BACKGROUND

Providers of applications, such as healthcare applications, provide clients with access to applications through identify providers or identity service providers. Typically, application providers provide clients access to their applications on a client-by-client basis, where each client is onboarded as a separate entity. Clients of the application provider may desire to provide application access to their own clients. However, many applications do not support such multi-tenancy access and there is no way for clients to provide their clients access to these applications via different roles or permission management.

SUMMARY

In an embodiment, systems and methods for incorporating multi tenancy access to application that do not normal support multi-tenant access are provided. A multi-tenant sidecar application is created that allows entities to create contexts for each tenant, onboard users, assign users to contexts, and define roles and permissions for each user assigned to a context. When an application is onboarded into the sidecar application for an entity, an API is exposed to the application that allows it to receive details on the various users, contexts, and roles and permissions associated with the application. Only users who authenticate through an identity provider or an identity service provider may be allowed access to the API. Later, a user associated with the entity may use the sidecar application to log into an onboarded application and the application may retrieve the roles and contexts associated with the user for the entity using the API. The application may then be configured for the user according to the retrieved context and roles.

In an embodiment, a method is provided. The method includes: receiving an identifier of an application by a computing device, wherein the application does not support multi-tenant access; receiving identifiers of a plurality of users by the computing device; creating at least one context for the application by the computing device; adding a user of the plurality of users to the context by the computing device; receiving a request to access the application from the user by the computing device; determining the context associated with the user by the computing device; and providing access to the application for the user according to the determined context by the computing device.

Embodiments may include some or all of the following features. The request to access the application from the user may be provided to a multi-tenant sidecar application. The method may further include authenticating the user using one of an identify provider or an identity service provider. The method may further include creating at least one role for each user of the plurality of users and providing access to the application for the user according to the determined context and the at least one role for the user. The context may be associated with an entity. The user of the plurality of users may be added to the context through a graphical user interface. The method may further include determining the context associated with the user comprises determining the context using an API exposed to the application by a multi-tenant sidecar application.

In an embodiment, a system is provided. The system may include a at least one computing device and computer-readable medium storing computer-executable instructions that when executed by the at least one computing device cause the at least one computing device to: receive an identifier of an application, wherein the application does not support multi-tenant access; receive identifiers of a plurality of users; create at least one context for the application; add a user of the plurality of users to the context; receive a request to access the application from the user; determine the context associated with the user; and provide access to the application for the user according to the determined context.

Embodiments may include some or all of the following features. The request to access the application from the user may be provided to a multi-tenant sidecar application. The method may further include authenticating the user using one of an identify provider or an identity service provider. The method may further include creating at least one role for each user of the plurality of users and providing access to the application for the user according to the determined context and the at least one role for the user. The context may be associated with an entity. The user of the plurality of users may be added to the context through a graphical user interface. The method may further include determining the context associated with the user comprises determining the context using an API exposed to the application by a multi-tenant sidecar application.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate systems and methods for providing multi-tenant access to applications. Together with the description, the figures further serve to explain the principles of the systems and methods for providing multi-tenant access to applications described herein and thereby enable a person skilled in the pertinent art to make and use the systems and methods for providing multi-tenant access to applications.

DETAILED DESCRIPTION

Figure 1:
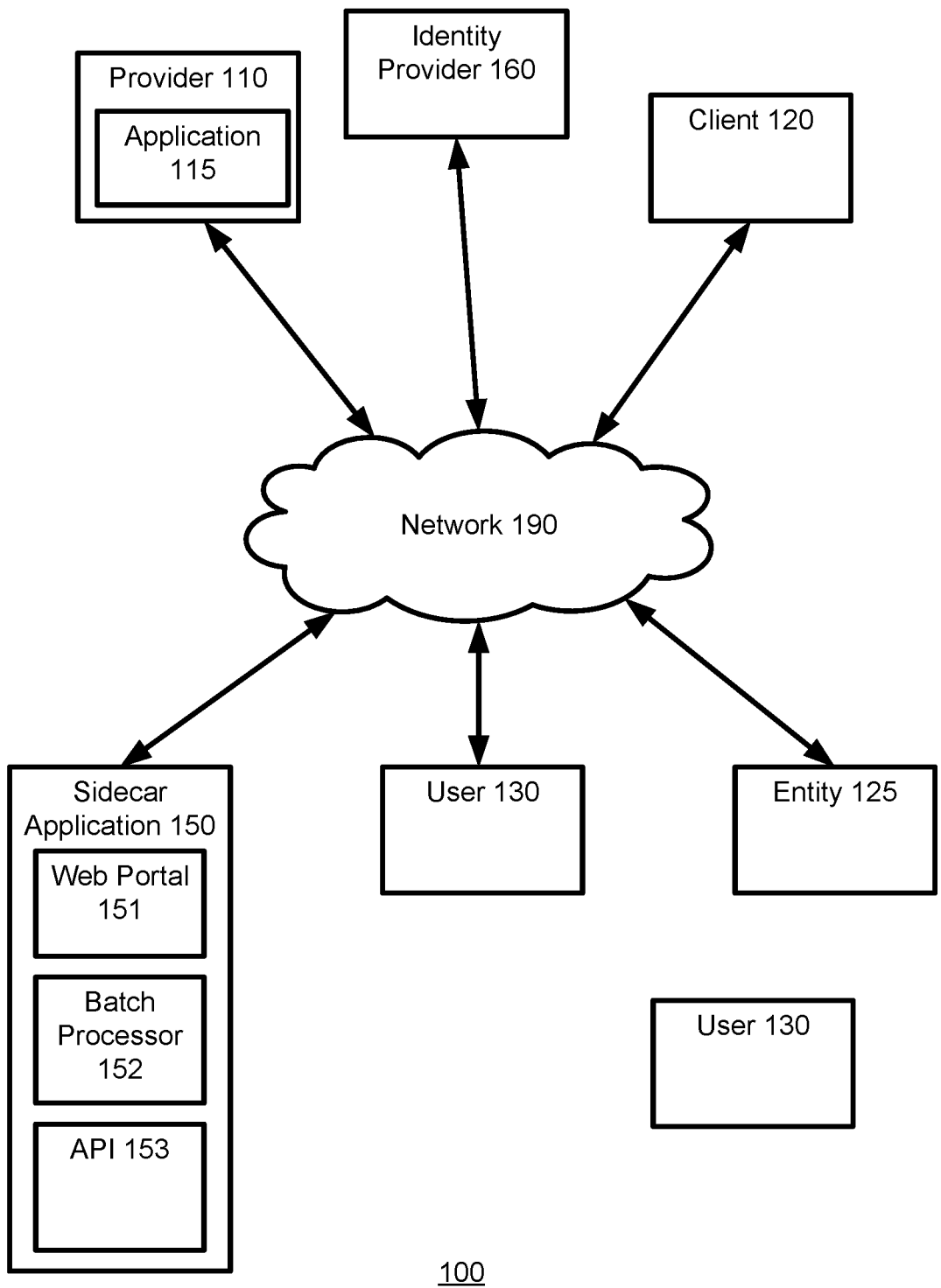
FIG. 1 is an example environment for using a multi-tenant sidecar application.

FIG. 1 is an example computing environment 100 for providing multi-tenant access to applications. As shown, the environment 100 includes one or more providers 110, identity providers 160, clients 120, entities 125, holders 120, and users 130 communicating through a network 190. The network 190 may include a combination of public and private networks. Each of the providers 110, identity providers 160, clients 120, entities 125, holders 120, and users 130 may be implemented using one or more general purpose computing devices such as the computing device 400 illustrated with respect to FIG. 4.

The providers 110 may provide one or more applications 115 for use by entities 125 through the network 190. For example, the provider 110 may be an insurance claim clearinghouse and the entity 125 may be an insurance company that the uses the clearinghouse. The application 115 may be an application 115 that allows the entity 125 to view claims received by the provider 110 for the entity 125. Other types of applications 115, entities 125, and providers 110 may be supported.

The identify provider 160 may be a service that stores and manages digital identifies for users 130. Generally, providers 110 and entities 125 may use these identify providers 160 to manage access to resources such as application 115. Examples of identify providers 160 include Google Sign-In™. Other identity providers 160 may be supported. Identity providers 160 may also be referred to as identity service providers 160.

Generally, a provider 110 provides access to an application 115 to an entity 125 for a single user 130 associated with the entity 125. The single user 130 of the entity 125 is provided access to the application 115 by the identity provider 160 using a single identity such as an email address or identifier. This is referred to a single tenant access because each entity 125, or tenant, is provided access to the application 115 via a single user 130 or user account.

As may be appreciated, entities 125 may have one or more clients 120, and the entities 125 may desire to provide access to the application 115 of the providers 110 to their one or more clients 120. However, because of the limitations of the single tenant access provided by the provider 110 of the application 115, an entity 125 may not be able to provide access to a client 120 without also giving the client 120 the same user account or credentials that the entity 125 uses to access the application 115. As used herein clients 120 may refer to clients, partners, and subsidiaries of the entity 125.

For example, an entity 125 such as a large national health insurance company may be associated with multiple clients 120 that are smaller regional insurance companies. The large national health insurance company may have access to an application 115 that lets them view the claims made to the clearinghouse provider 110. These claims may include the claims made to the smaller client regional insurance company. The large national health insurance company would like to provide each client insurance company access to the application 115 but in a way that restricts them to only viewing their associated claims. However, such customized permissions are not supported using single tenant access.

Accordingly, to solve the problem described above and more, the environment 100 may further include a sidecar application 150. The sidecar application 150 may provide multi-tenant support for applications 115 that do not normally support multi-tenant usage. As will be described further below, developers may use the sidecar application 150 to select an application 115 for onboarding, create users 130, create contexts for each client 120, and assign users 130 and roles (e.g., permissions) to each context. Users 130 may later use the application 115 by first logging into the sidecar application 150. The sidecar application 140 may then determine the context and role associated with the user 130 and may configure the application 115 according to the determined the context and roles associated with the user 130. The user 130 may then use the application 115 according to the context and the roles defined by the sidecar application 150.

In the example shown, the sidecar application 150 has three component a web portal 151, a batch processor 152, and an application programing interface ("API") 153. More or fewer components may be supported.

The web portal 151 may be used by developers to onboard applications 115 into the sidecar application 150 for an entity 125, create contexts for each client 120 associated with an entity 125, to associate users 130 with each context, and to create roles for each user 130. In some embodiments, the context may be associated with a unique identifier of a particular client 120 associated with the entity 125. The context may define the scope of the usage of the application 115 that is provided to users 130 associated with the client 120 such as the particular menus, features, and data structures associated with the application 115 that the users 130 are allowed to access. The context may further include custom text, graphics, themes, or other branding that the users 130 of the entity 125 see when using the application 115. The role for a user may include the particular read and/or write permission grated to the user such as admin or user.

Once the application 115 has been onboarded into the sidecar application 150, the developer may use the web portal 151 to add users 130 to a context associated with a client 120. For example, the developer may add users 130 by selecting users 130 by email address, or other identifier, and adding them to the context. In addition, the developer may assign a role to each user 130 as they are added to the context such as admin or user. If no role is specified or provided for a user 130, a default role may be assigned to the user 130.

Depending on the embodiment, prior to onboarding the application 115 and adding users 130 to the content for the application 115, the application 115 and each of the users 130 may have been onboarded into the identity provider 160. That is each of the users 130 can be authenticated by the identity provider 160 for the application 115. In addition, each of the users 130 may be provided with an admin or user role for the sidecar application 150.

The batch processor 152 may allow developers to quickly add users 130 to contexts for applications 115. As may be appreciated, using the web portal 151 to manually add users 130 to contexts may become tedious where there are multiple users 130 for a context. Accordingly, the batch process 152 may allow developers to provide a table, spreadsheet, or other file that includes a record for each user 130 to add, an identifier of the user 130 (e.g., email address), an identifier of the application 115, an identifier of the context, and an identifier of any role or role for the user 130. Where a user 130 is being added to multiple applications 115 and/or contexts, multiple records for the user 130 may be provided. For example, an example table that may be uploaded into the batch processor 152 is:

| Email | App | Context | Role |
|---|---|---|---|
| john@example.com | 99fd87364921 | 112233 | admin |
| john@example.com | 7b0d9ad8ece0 | 1080028 | admin, user |
| steve@example.com | 99fd87364921 | 1316028 | user |
| steve@example.com | 99fd87364921 | 1080028 | user |

As shown, the example table includes a column for the user identifier (e.g., "Email"), a column for the application 115 identifier (e.g., "App"), a column for the context identifier (e.g., "Context"), and a column for the roles associated with the users 130 (e.g., "Roles"). More columns may be supported.

After the application 115 is onboarded into the sidecar application 150, the API 153 of the sidecar application is exposed to the application 115. The application 115 may then use the API 153 to get details (e.g., context and roles) about a user 130 that is logged into the application 115 via the sidecar application 150. The application 115 may then configure itself for the user 130 based on the provided content and roles.

In some embodiments, a user 130 may login to the application 115. After the user 130 is authenticated via the identify provider 160, the application 115 may use the API 153 to provide the identifier of the user 130 to the sidecar application 150. The sidecar application 150 may use the identifier of the user 130, and the identifier of the application 115, to determine the context and the role associated with the user 130. The application 115 may then configure itself for to user 130 according to the determined context and role.

For example, with reference to the example table above, the user 130 "john@example.com" may log into the application 115. After authenticating john@example.com using the identify provider 160, the application 115 may provide john@example.com to the sidecar application 150 using the API 153 along with an identifier of the application 115 "99fd87364921". The sidecar application 150 may search the table for a record for the user 130 john@example.com and the application 115 99fd87364921. The sidecar application 150 may find a matching record and may return the context "112233" to the application 115 along with the role "admin". The application 115 may then configure itself according to the provided context and role.

Figure 2:
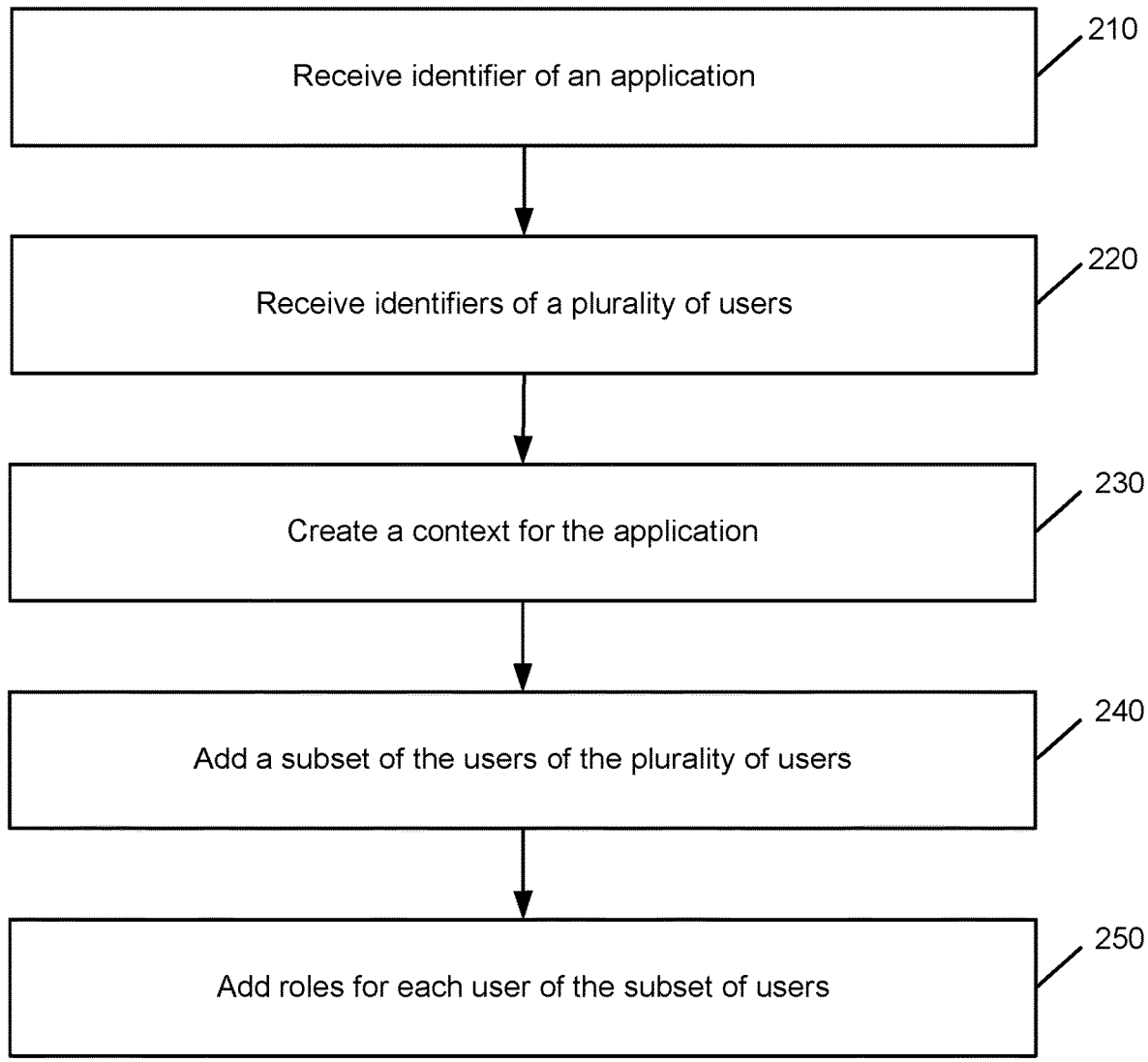
FIG. 2 is an illustration of an example method for configuring an application for use with a multi-tenant sidecar application.

FIG. 2 is an illustration of an example method for configuring an application for use with a multi-tenant sidecar application. The method 200 may be implemented by the sidecar application 150.

At 210, an identifier of an application is received. The identifier of an application 115 may be received by the sidecar application 150 though the web portal 151. The application 115 may be an application that does not natively support multi-tenant access. The application 115 may be provided by a provider 110 to an entity 125. The entity 125 may desire to provide multi-tenant access to the application 115 to one or more of its clients 120. Accordingly, to add multi-tenancy to the application 115, the entity 125 may provide an identifier of the application 115 to the sidecar application 150 and may begin onboarding the application 115 into the sidecar application.

A part of the onboarding process, the sidecar application 150 may provide access to an API 153 to the application 115. The application 115 may use the API 153 to retrieve information about users 130 (e.g., context and roles) that may be used by the application 115 to configure the application 115 for each user 130, and thereby provide multi-tenant access.

At 220, identifiers of a plurality of users are received. The identifiers may be received by the sidecar application 150. The identified users 130 may be users 130 that are onboarded with an identify provider 160. The identify provider 160 may provide authentication services to the application 115 and the sidecar application 150 for the identified users 130. The identifiers may be email addresses, for example. Other types of identifiers may be supported.

At 230, a context is created for the application. The context may be created using the web portal 151. In some embodiments, each client 120 and/or entity 125 may be associated with its own context. The context for an application 115 may control how the application 115 looks and operates to users 130 associated with the context. The context may be associated with a unique context identifier.

At 240, a subset of users of the plurality of users is added. The subset of users may be added to the created context using the web portal 151. The subset of users 130 may be users who were onboarded by the identity provider 180 and associated with the client 120 or entity 125 associated with the context.

At 250, roles are added for each user of subset of users. The roles may be added to each user using the web portal 151. The roles may control read and write access using the application 115 and include roles such as user and admin. Other roles may be used.

Figure 3:
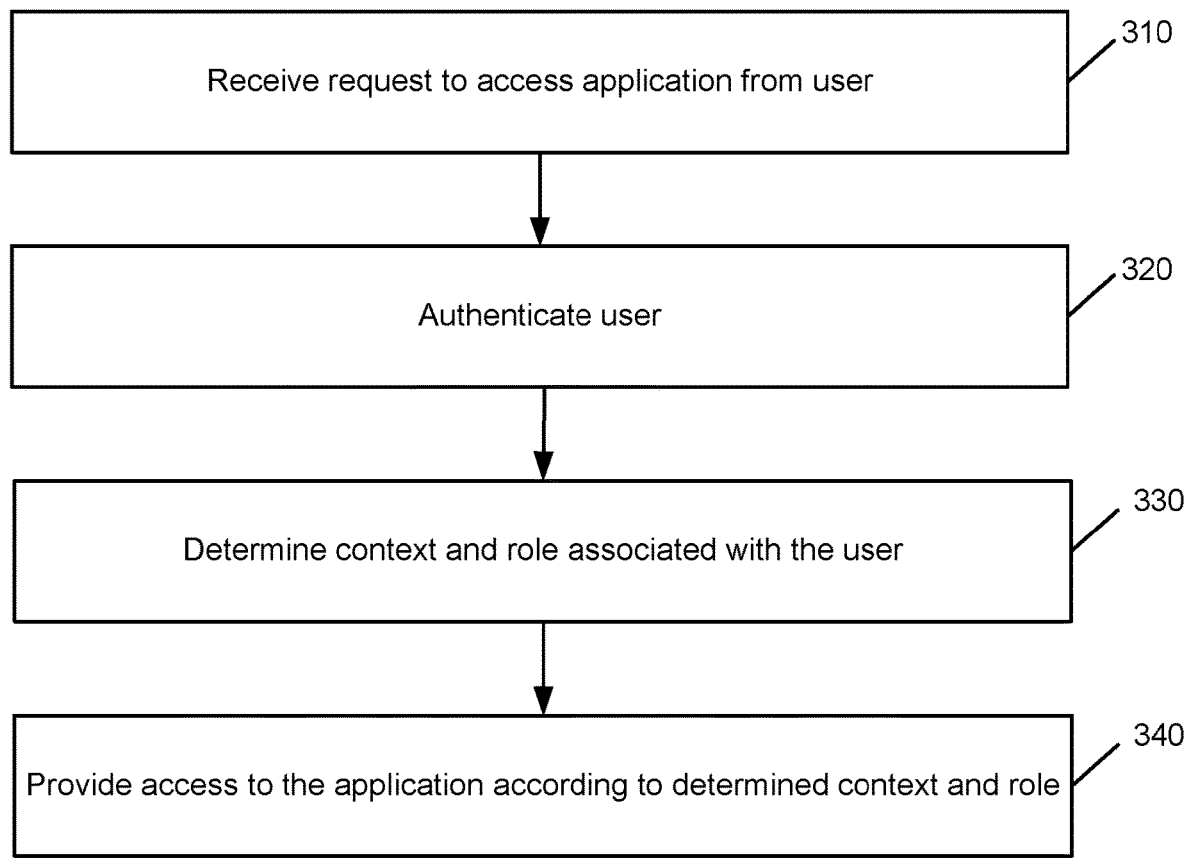
FIG. 3 is an illustration of an example method for providing multi-tenant access to an application using a multi-tenant sidecar application.

FIG. 3 is an illustration of an example method for providing multi-tenant access to an application using a multi-tenant sidecar application. The method 300 may be implemented by the sidecar application 150.

At 310, a request to access is received. The request may be received by an application 115 from a user 130. The application 115 may be associated with a sidecar application 150 that provided multi-tenant access to the application 115. Multi-tenancy means that users 130 associated with different clients 120 of an entity 125 are able to access the application 115 using their own credentials and with a context that is associated with the particular client 120. In some embodiments, the request may be provided by the user 130 to the application 115 through the network 190.

At 320, the user is authenticated. The user 130 may be authenticated for the application 115 by the identify provider 160. Any method for authenticating a user 130 may be used.

At 330, a context and role associated with the user is determined. The context and role may be determined by the sidecar application 150. For example, the sidecar application 150 may search for a context and role associated with the user 120 (or identifier of the user 130) in a data structure such as the table described and illustrated above.

At 340, access to the application is provided according to determined context and role. The access may be provided to the user of the application by the sidecar application 150. For example, the sidecar application 150 may expose an API 153 that the application 115 may use to receive the context and role from the sidecar application 150. The application 115 may then allow the user to use the application 115 according to the context and role.

Figure 4:
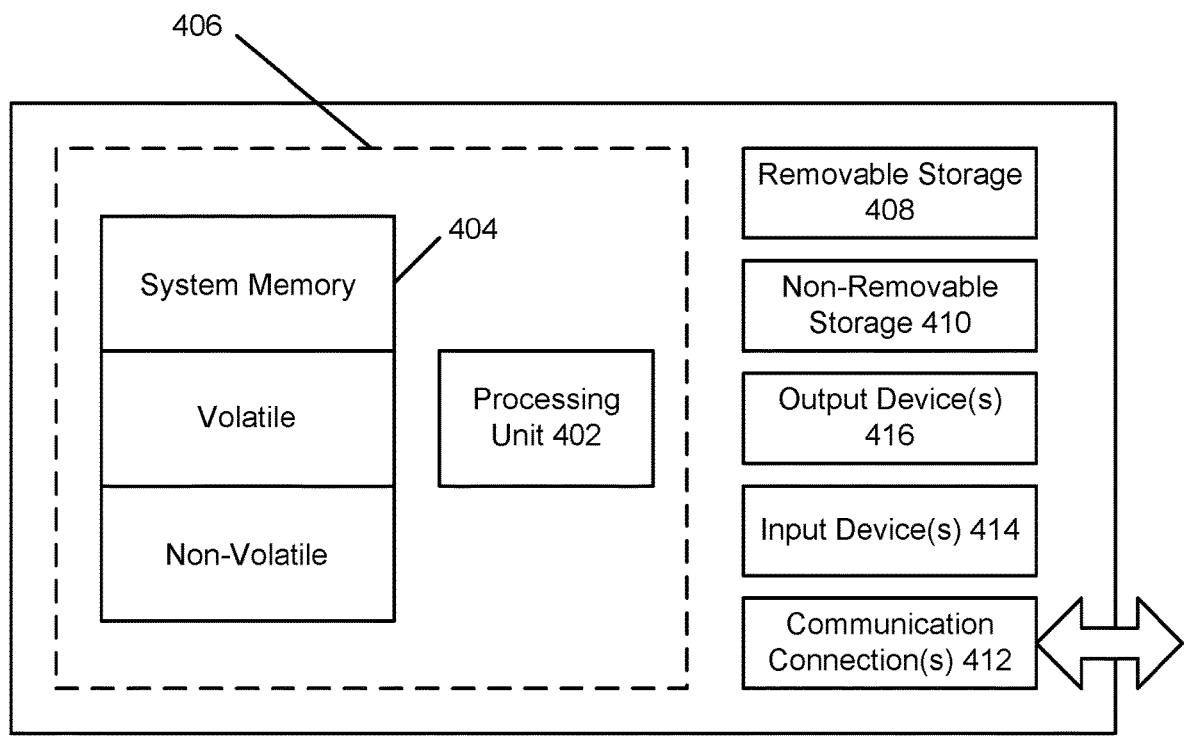
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, by one or more processors implementing a multi-tenant sidecar application, an identifier of an application to be onboarded to the multi-tenant sidecar application, wherein the application supports access by a plurality of entities but does not support multi-tenant access for any single entity of the plurality of entities;
receiving, by the one or more processors implementing the multi-tenant sidecar application, identifiers of a plurality of users associated with a particular entity of the plurality of entities;
creating, by the one or more processors implementing the multi-tenant sidecar application, a context for the particular entity and the application;
adding, by the one or more processors implementing the multi-tenant sidecar application, a subset of users of the plurality of users to the context; and
providing, by the one or more processors implementing the multi-tenant sidecar application, multi-tenant access to the application for the subset of users according to the context using an application program interface (API) exposed to the application by the multi-tenant sidecar application.

2. The computer-implemented method of claim 1, wherein the context includes graphics to display in the application for the subset of users.

3. The computer-implemented method of claim 1, further comprising authenticating, by the one or more processors, users of the subset of users using one of an identity provider or an identity service provider.

4. The computer-implemented method of claim 1, further comprising creating, by the one or more processors, at least one role for the user of the subset of users and providing, by the one or more processors, access to the application for each user according to the context and the at least one role for the user.

5. The computer-implemented method of claim 1, wherein the subset of users is added to the context through a graphical user interface.

6. A system comprising:
one or more processors; and
one or more memories storing processor-executable instructions of a multi-tenant sidecar application that, when executed by the one or more processors, cause the one or more processors to perform operations comprising:
- receiving an identifier of an application to be onboarded to the multi-tenant sidecar application, wherein the application supports access by a plurality of entities but does not support multi-tenant access for any single entity of the plurality of entities;
- receiving identifiers of a plurality of users associated with a particular entity of the plurality of entities;
- creating a context for the particular entity and the application;
- adding a subset of users of the plurality of users to the context; and
- providing multi-tenant access to the application for the subset of users according to the context using an application program interface (API) exposed to the application by the multi-tenant sidecar application.

7. The system of claim 6, wherein the context includes graphics to display in the application for the subset of users.

8. The system of claim 6, wherein the processor-executable instructions further cause the one or more processors to perform operations comprising:
- authenticating users of the subset of users using one of an identity provider or an identity service provider.

9. The system of claim 6, wherein the processor-executable instructions further cause the one or more processors to perform operations comprising:
- creating at least one role for the user of the subset of users and providing access to the application for each user according to the context and the at least one role for the user.

10. The system of claim 6, wherein the subset of users is added to the context through a graphical user interface.

11. One or more non-transitory computer-readable media storing processor-executable instructions of a multi-tenant sidecar application that, when executed by one or more processors, cause the one or more processors to perform operations comprising:
- receiving an identifier of an application to be onboarded to the multi-tenant sidecar application, wherein the application supports access by a plurality of entities but does not support multi-tenant access for any single entity of the plurality of entities;
- receiving identifiers of a plurality of users associated with a particular entity of the plurality of entities;
- creating a context for the particular entity and the application;
- adding a subset of users of the plurality of users to the context; and
- providing multi-tenant access to the application for the subset of users according to the context using an application program interface (API) exposed to the application by the multi-tenant sidecar application.

12. The one or more non-transitory computer-readable media of claim 11, wherein the context includes graphics to display in the application for the subset of users.

13. The one or more non-transitory computer-readable media of claim 12, wherein the processor-executable instructions further cause the one or more processors to perform operations comprising:
- authenticating users of the subset of users using one of an identity provider or an identity service provider.

14. The one or more non-transitory computer-readable media of claim 12, wherein the processor-executable instructions further cause the one or more processors to perform operations comprising:
- creating at least one role for each user of the subset of users and providing access to the application for the user according to the context and the at least one role for the user.

15. The one or more non-transitory computer-readable media of claim 12, wherein the subset of users is added to the context through a graphical user interface.

* * * * *